June 28, 1949.  C. W. KLUG  2,474,679
ELECTRIC MOTOR CONTROL PROPORTIONING SYSTEM
Filed June 19, 1944
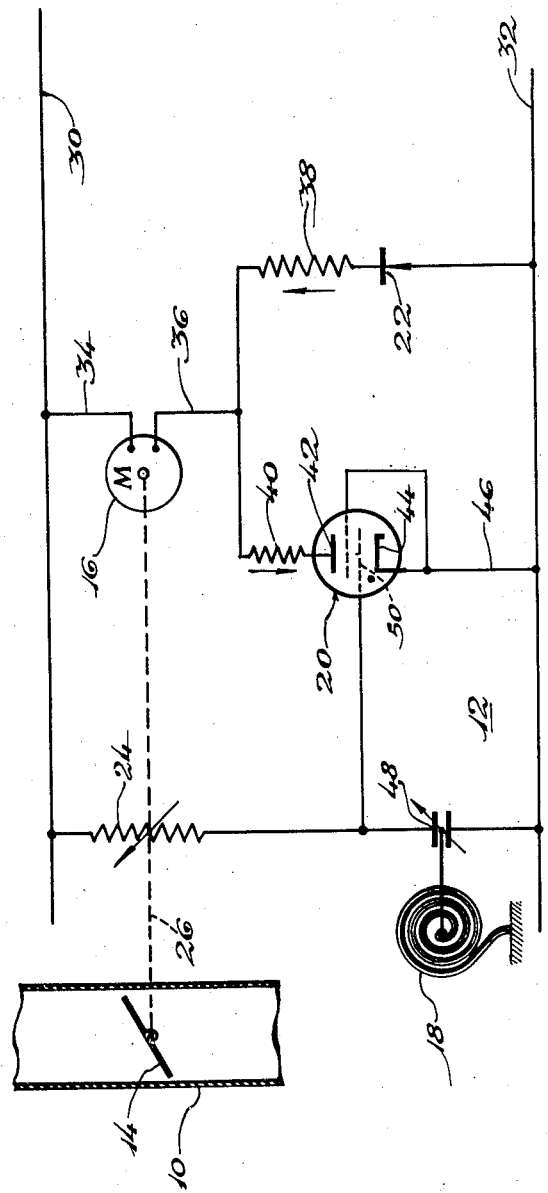

Patented June 28, 1949

2,474,679

UNITED STATES PATENT OFFICE 2,474,679

ELECTRIC MOTOR CONTROL PROPORTIONING SYSTEM

Charles W. Klug, Chicago, Ill., assignor to Stewart Warner Corporation, Chicago, Ill., a corporation of Virginia Application June 19, 1944, Serial No. 541,011

1 Claim. (Cl. 318—28)

The present invention relates to improvements in proportioning systems, and especially to electronic proportioning systems which are utilizable to control condition changing means in response to variations of the condition.

The primary object of the present invention is to provide a new and improved proportioning system, and more especially a new and improved electronic proportioning system.

Another object of the present invention is to provide a proportioning control wherein the control effect exerted upon the means controlling the condition changing means is proportional to the deviation of the condition from a normal or desired value.

A further object of the invention is to provide a control of the character specified in the preceding paragraph wherein the control effect is directly proportional to the deviation of the condition, i. e., the greater the deviation the greater the control effect and the smaller the deviation the smaller the control effect, whereby "hunting" or "overshooting" is minimized and quick and accurate control is made possible.

Other objects and advantages of the present invention will become apparent from the ensuing description of an embodiment of the invention, in the course of which reference is had to the accompanying drawing, the single figure of which diagrammatically represents one embodiment of the invention.

The proportioning control of the present invention may be utilized for various purposes wherein a condition changing means is to be controlled in response to variation of the condition from some predetermined or normal value. For instance, it may be used in connection with apparatus for heating or cooling enclosures, furnaces, humidifiers, and many other types of apparatus. In the illustrative embodiment, it has been shown applied to an enclosure heating system.

An enclosed space, such as a room, is supplied with heated air (from some suitable source, not shown) through a conduit 10, the amount of heated air supplied to the room being controlled by the proportioning control of this invention so that the output of the condition changing means is sufficient to maintain the condition at a predetermined or desired value. The control apparatus includes, in the main, the condition responsive proportioning control, indicated as a whole by reference character 12, a variable output condition changing means including the conduit 10 and a valve or damper 14 movably mounted within conduit 10 and operable to different positions to vary the amount of heated air supplied to the enclosure, and means for varying the output of the condition changing means, i. e., a motor 16 for moving the damper to different positions.

The control is responsive to variations of the condition and the control effect is proportional to the deviation of the condition from a predetermined normal and in a direction to compensate for the direction of the deviation. It includes a condition responsive device 18 controlling the speed of rotation and the direction of rotation of the motor. The device 18 may be a bimetallic temperature responsive element controlling an electronic tube 20 which controls the flow of current to the motor, which is also supplied with current through a rectifier 22.

The control is constructed and arranged so as to be balanced when the condition is at its predetermined or normal value or when the damper has been moved to a position wherein a desired amount of heated air is being supplied to the enclosure. When these conditions obtain, a balance is effected by means of a resistor 24 variable by the motor and counteracting the control effect of the temperature responsive means. The resistor is variable by an element movable by a motor driven shaft 26 also operating the damper 14. Thus the effective value of the resistor is dependent upon the position of the damper.

Power is supplied to the system from a suitable source of current, as through supply lines 30 and 32 which may be connected to a source of alternating current.

The motor 16 is preferably a small direct current motor of a commercially obtainable type (Delco) having a permanent magnet field and an armature connected across the power supply lines through conductors 34 and 36 and the previously mentioned parallel connected tube 20 and rectifier 22. The latter are so arranged that current flows in opposite directions through the motor armature on opposite half cycles of the alternating current and that the direction of rotation and speed of direction are controlled by varying the current flowing through the tube 20, the rectifier passing a constant current as it is connected across conductors 32 and 36 through a current limiting resistor 38.

The tube 20 is preferably a grid controlled gas tube or "Thyratron." Its anode-cathode circuit is connected across conductors 32 and 36 through a current limiting resistor 40. The resistor is connected to the plate 42 and the cathode 44 is connected to conductor 32 by conductor 46.

The average plate current of the tube is controlled in response to variations in the condition (temperature) within the enclosure and in response to the position of the damper. The control is effected as by a phase shift network including the series connected variable resistor 24 and a variable capacitor 48, the junction of which is connected to the grid 50 of tube 20 so that the average plate current of the tube may be varied. The value of the capacitor is controlled by the condition responsive element 18 while the value of resistor 24 is controlled by the motor and damper position.

In the following description of the operation it will be assumed that the system is constructed so that it is balanced when the enclosure temperature is at 72 degrees Fahrenheit.

At this time the damper 14 may or may not be closed, but for purposes of description it will be assumed to be closed. The motor is stationary as the average current flow through the armature is zero, as is the torque exerted thereby, the current flow through the armature during alternate half cycles being in opposite directions and of equal magnitudes. During one-half cycle current flows from conductor 32 to conductor 30 through rectifier 22, resistor 38, conductor 36, motor 16 and conductor 34. During the other half cycle, current flows in the opposite direction from conductor 30 to conductor 32 through conductor 34, motor 16, conductor 36, resistor 40, the tube 20, and conductor 46.

When the temperature within the enclosure decreases, the temperature responsive element 18 varies capacitor 48 to vary the phase of the voltage applied to grid 50 to change (increase) the average plate current. Thus the average current through the armature is increased and in such direction as to effect rotation of the motor in a direction to open the damper 14. As the motor opens the damper, it also changes resistor 24 in a direction tending to return the grid voltage phase to its initial value, thereby to balance the control. As the balanced condition is approached, the average current flowing through the motor is decreased, as is the motor torque, so that balance is reached at an increasingly lower rate. As a result, "overshooting" or "hunting" is minimized and accurate control is obtained.

The magnitude of the average current flow through the motor and the motor torque under unbalanced conditions are proportional to the deviation. The greater the deviation the greater the phase shift and the greater the average plate current through the tube. This is the case not only when the temperature within the enclosure falls, but also when the temperature rises, in which event the phase shift is in a direction to decrease the average plate current of the tube.

Should the enclosure temperature fall further, the flow of current through the tube is again increased and the motor operates further to open the valve 14 so that more heat is supplied to the enclosure.

In the event the temperature within the enclosure rises above the desired value, the flow of current through the tube is decreased and the current flow through the rectifier predominates. The average motor current is thus reversed and the motor operates to close the damper until the control circuit is balanced by the resulting change in resistor 24.

It may thus be noted that the control of the present invention regulates or modulates the amount of heat supplied to the enclosure and that the rate at which the amount is changed is dependent upon the deviation. The greater the deviation the greater the motor current and the faster the rate at which the damper is operated. Thus a balanced condition is approached at a low rate and "overshooting" and "hunting" are avoided.

While but a single embodiment of the invention has been illustrated and described in detail, it should be understood that the principles of the present invention are applicable to many different types of installations and are capable of modification.

What I claim as new and desire to secure by United States Letters Patent is, as follows:

A control for controlling variable output condition changing means in response to the deviation of the condition from a predetermined value, including in combination, means controlling the output of the condition changing means, a reversible variable torque direct current electric motor for operating said controlling means, condition responsive means, and balanced means controlled by said condition responsive means and motor for varying the average torque and direction of torque exerted by said motor means in proportion to the deviation of the condition from the predetermined value, said last mentioned means including a source of alternating current, a rectifier connecting said motor across said source to provide said motor with a constant average direct current in one direction, and an electron tube connected in parallel with said rectifier and having a variable current output also connecting said motor across said source, said electron tube having a control grid, means including variable phase shifting means connecting said grid to said alternating current source such that the average direct current flow through said electron tube is determined by the phase relationship of said grid to said alternating current source, said variable phase shifting means being connected to be varied by said condition responsive means and said motor so that phase shifts in one direction caused by changes in the condition responsive means are balanced by equal and opposite phase shifts due to movement of said motor and controlling means to a new position where the output controlled by said controlling means balances the anticipated required output.

CHARLES W. KLUG.

REFERENCES CITED

The following references are of record in the file of this patent:

UNITED STATES PATENTS

| Number | Name | Date |
|---|---|---|
| 2,010,577 | Wilson | Aug. 6, 1935 |
| 2,131,759 | Satterlee | Oct. 4, 1938 |
| 2,175,009 | Anderson | Oct. 3, 1939 |
| 2,275,317 | Ryder | Mar. 3, 1942 |
| 2,288,338 | Willis | June 30, 1942 |
| 2,349,963 | Harrison | May 30, 1944 |
| 2,437,140 | Waldie | Mar. 2, 1948 |